(12) United States Patent
Tanaka

(10) Patent No.: US 7,448,784 B2
(45) Date of Patent: Nov. 11, 2008

(54) LIGHTING DEVICE

(75) Inventor: Mitsuru Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 11/285,052

(22) Filed: Nov. 22, 2005

(65) Prior Publication Data

US 2006/0109689 A1 May 25, 2006

(30) Foreign Application Priority Data

Nov. 22, 2004 (JP) ............................. 2004-338127

(51) Int. Cl.
*F21V 7/04* (2006.01)
(52) U.S. Cl. .................... 362/611; 362/630; 362/634; 313/626; 313/625; 313/624
(58) Field of Classification Search .............. 362/611, 362/630, 632, 652, 260, 225, 633, 634, 390; 313/624–626; 439/226
See application file for complete search history.

(56) References Cited

U.S. PATENT DOCUMENTS

| 6,830,354 | B2 * | 12/2004 | Ono | 362/614 |
| 6,947,104 | B2 * | 9/2005 | Yu et al. | 349/61 |
| 7,070,298 | B2 * | 7/2006 | Mai | 362/218 |
| 2002/0086573 | A1 * | 7/2002 | You | 439/226 |
| 2007/0171675 | A1 * | 7/2007 | Sakai et al. | 362/613 |

FOREIGN PATENT DOCUMENTS

JP 2002-245838 8/2002

OTHER PUBLICATIONS

Patent Abstracts of Japan, Publication No. 2002-245838, dated Aug. 30, 2002 (2 pages).

* cited by examiner

*Primary Examiner*—Sandra O'Shea
*Assistant Examiner*—Evan Dzierzynski
(74) *Attorney, Agent, or Firm*—Osha • Liang LLP

(57) ABSTRACT

A branch portion of a socket is formed into a thin cylindrical shape so that it can be elastically displaced, end faces of both side plates of a lamp reflector are made to be points for positioning, positioning protrusions are integrally protruded from both side outer end edge portions of each socket body, under the condition that a substantially L-shaped through-passage of each socket is externally engaged with each lead wire, an end portion of each lead wire is brazed to both end portions of a straight-pipe-shaped light source, when each socket is slid along each lead wire, each socket covers a region from the end portion of each lead wire to the end portion of the straight-pipe-shaped light source, and each socket body is inserted into a lamp reflector so as to make a positioning protrusion come into contact with a positioning point.

3 Claims, 7 Drawing Sheets

LIGHTING DEVICE

BACKGROUND OF THE INVENTION

1. Field of the Invention

The present invention relates to a lighting device incorporated into a liquid crystal module, for example, used for a display section of a laser printer.

2. Description of the Related Art

FIGS. 3 and 4 are views showing a liquid crystal module technique. According to this technique, the liquid crystal cells 2 and the light guide plate 3 are arranged in the bezel 1 and the lighting device 4 is arranged in a space formed between the light guide plate 3 and the edge plate portion la of the bezel 1 opposed to the light guide plate 3. The lighting device 4 illuminates the liquid crystal cells 2 from the back via the light guide plate 3. In this connection, reference numeral 5 is a polarizing plate, reference numeral 6 is a prism sheet, reference numeral 7 is a diffusion sheet, reference numeral 8 is a reflection sheet, reference numeral 9 is a flat flexible cable connected to the liquid crystal cells 2, and reference numeral 10 is a plug connected to each end portion of both lead wires 14.

The conventional technique of the lighting device 4 described above is disclosed in JP-A-2002-245838. Referring to FIGS. 5A to 5D, an example of the technique will be explained as follows. The lighting device 4 includes: a bottom plate 11a; a pair of side plates 11b which are bent at right angles from the bottom plate 11a; a lamp reflector 11 made of metal, the lateral cross section of which is a C-shape, having cutout portions 12 formed at both end portions of the bottom plate 11a; a straight-pipe-shaped light source 13 composed of a cold cathode ray tube arranged in the lamp reflector 11; a pair of lead wires 14 brazed to the straight-pipe-shaped light source 13; and a pair of sockets 15 made of elastic material such as rubber including a socket body 15A, the width h of which is substantially the same as the interval d between both side plates 11b of the lamp reflector 11, and including a branch portion 15B integrally protruding from the bottom face of the socket body 15A, the substantially L-shaped through-passage 16 being formed in a region from the inner end face of the socket body 15A to the inner face of the branch portion 15B, wherein the engagement protrusions 17 are integrally protruded from both sides of each socket, and the engagement holes 18 are formed on both side plates 11b of the lamp reflector 11 being opposed to the engagement protrusions 17.

The procedure of assembling the lighting device 4 will be explained below. The socket body 15A of each socket 15, which has covered a region from the end portion of each lead wire 14 to the end portion of the straight-pipe-shaped light source 13, is inserted into the lamp reflector 11 and each engagement protrusion is engaged with each engagement hole 18. In this way, the straight-pipe-shaped light source 13 can be positioned at a predetermined position in the lamp reflector 11.

SUMMARY OF THE INVENTION

According to the conventional structure, in order to position the straight-pipe-shaped light source 13 at a predetermined position in the lamp reflector 11, it is necessary to drill both side plates 11b of the lamp reflector 11 so as to form four engagement holes 18. Therefore, it takes time and labor to conduct drilling and the manufacturing cost is raised.

Therefore, it is possible to consider the following structure. As shown in FIGS. 6A to 6D, the engagement protrusions 17 and the engagement holes 18 are omitted, and the branch portion 15B of each socket 15 is formed into a rectangular block shape, which is the same as the shape of each cutout portion 12. Then, the inner end face 15a of each branch portion 15B is contacted with the end face 12a of each cutout portion 12, and the straight-pipe-shaped light source 13 is positioned at a predetermined position in the lamp reflector 11.

According to the above structure, as shown in FIG. 7A, under the condition that the substantially L-shaped through-passage 16 of each socket body 15A is externally engaged with each lead wire 14, as shown in FIG. 7B, the end portion 14a of each lead wire 14 is engaged with and brazed 21 to both end portions 13a of the straight-pipe-shaped light source 13. As shown in FIG. 7C, when each socket 15 is slid along each lead wire 14, each socket 15 covers a region from the end portion 14a of each lead wire 14 to the end portion 13b of the straight-pipe-shaped light source 13. In this case, since the wall thickness of the branch portion 15B is large and the shape of the branch portion 15B is difficult to be elastically deformed, the branch portion 15B is hard to be deformed. Therefore, the bending angle α of the lead wire 14 in the substantially L-shaped through-passage 16 is substantially fixed to the right angle in a small space as shown in FIG. 7D. Accordingly, when each socket 15 is slid along each lead wire 14, an excessively high frictional resistance is generated. Due to this excessively high frictional resistance, it takes time and labor to attach each socket 15. This complicated work imposes a heavy burden on a worker. Further, while each socket 15 is being attached, the braze 21 may be damaged.

The present invention has been accomplished to solve the above conventional problems. An object of the present invention is to provide an inexpensive lighting device in which a socket can be quickly, easily attached.

In order to accomplish the above object, according to a first aspect of the invention, there is provided a lighting device arranged in a bezel of a liquid crystal module for illuminating liquid crystal cells from the back via a light guide plate, including: a lamp reflector, the lateral cross section of which is a C-shape, having a bottom plate and a pair of side plates which are bent from the bottom plate at right angles, cutout portions being formed at both end portions of the bottom plate; a straight-pipe-shaped light source arranged in the lamp reflector; a pair of lead wires brazed to the straight-pipe-shaped light source; and a pair of sockets made of elastic material, having a socket body, the width of which is substantially the same as the interval of both side plates of the lamp reflector, and also having a branch portion integrally protruding from a bottom face of the socket body, a substantially L-shaped through-passage being formed in a region from an inner end face of the socket body to an end face of the branch portion, wherein an engagement protrusion is integrally protruded from both sides of each socket body, an engagement hole is formed on both side plates of the lamp reflector being opposed to each engagement protrusion, and when each socket body is inserted into the lamp reflector and each engagement protrusion is engaged with each engagement hole of the lamp reflector, the straight-pipe-shaped light source is positioned at a predetermined position in the lamp reflector, the lighting device characterized in that: the branch portion is formed into a thin cylindrical shape capable of being elastically displaced, the engagement protrusion and the engagement hole are omitted and each end face of both side plates of the lamp reflector is used as a positioning point, a positioning protrusion is integrally protruded at both side outer end edge portions of the socket body being opposed to each positioning point, while the substantially L-shaped through-passage of the socket is being externally engaged with each lead wire, an end portion of each lead wire is brazed to both end portions of the straight-pipe-shaped light source, when each socket is slid along each lead wire, the socket is made to cover each lead wire from the end portion to the end portion of the straight-pipe-shaped light source, and when each socket body is inserted into the lamp reflector and the positioning protrusion is contacted with the positioning point, the straight-pipe-shaped light source is positioned at a predetermined position in the lamp reflector.

According to a second aspect of the invention, there is provided a lighting device including: a lamp reflector, the lateral cross section of which is a C-shape, having a bottom plate and a pair of side plates which are bent from the bottom plate at right angles, cutout portions being formed at both end portions of the bottom plate; a straight-pipe-shaped light source arranged in the lamp reflector; a pair of lead wires brazed to the straight-pipe-shaped light source; and a pair of sockets made of elastic material, having a socket body, the width of which is substantially the same as the interval of both side plates of the lamp reflector, and also having a branch portion integrally protruding from a bottom face of the socket body, a substantially L-shaped through-passage being formed in a region from an inner end face of the socket body to an end face of the branch portion, wherein each socket is made to cover a region from an end portion of each lead wire to an end portion of the straight-pipe-shaped light source, the branch portion is formed into a thin cylindrical shape capable of being elastically displaced, an appropriate portion on the outer circumferential face of the lamp reflector is made to be a positioning point, a positioning portion is provided in an appropriate portion of the outer circumferential edge of the socket body being opposed to the positioning point, while the substantially L-shaped through-passage of the socket is being externally engaged with each lead wire, an end portion of each lead wire is brazed to both end portions of the straight-pipe-shaped light source, when each socket is slid along each lead wire, the socket is made to cover each lead wire from the end portion to the end portion of the straight-pipe-shaped light source, and when each socket body is inserted into the lamp reflector and the positioning portion is contacted with the positioning point, the straight-pipe-shaped light source is positioned at a predetermined position in the lamp reflector.

According to a third aspect of the invention, there is provided a lighting device according to the second aspect of the invention, wherein the positioning point is each end face of both side plates of the lamp reflector, the positioning portion is composed of positioning protrusions integrally protruding from the outer end edges on both sides of the socket body, and when the positioning protrusions are contacted with the end faces of both side plates of the lamp reflector, which are the positioning points, the straight-pipe-shaped light source is positioned at a predetermined position in the lamp reflector.

The first aspect of the invention corresponds to an embodiment (shown in FIGS. 1A to 2C) of the present invention. Due to the invention, the branch portion of each socket is formed into a thin cylindrical shape so that it can be elastically displaced. Therefore, when each socket is slid along each lead wire, the branch portion is elastically displaced by each lead wire, and the bending angle of each lead wire in the substantially L-shaped through-hole can be extended. Accordingly, a frictional resistance generated when each socket is slid along each lead wire can be reduced. Therefore, each socket can be smoothly slid along each lead wire so that the socket can quickly, easily cover a region from the end portion of each lead wire to the end portion of the straight-pipe-shaped light source. Further, there is no possibility that the brazed portion is damaged in the process of attaching work. Furthermore, there is no possibility that a heavy burden is imposed on a worker.

Only when each socket body is inserted into the lamp reflector so that the lamp reflector can be pinched from both sides by the positioning protrusions, the straight-pipe-shaped light source located between both socket bodies can be properly positioned at a predetermined position in the lamp reflector. In this case, different from the conventional case, it is unnecessary to drill in the lamp reflector so as to form an engagement hole in the lamp reflector. Accordingly, the manufacturing cost can be reduced because the drilling work can be eliminated.

Especially when this lighting device is incorporated into the bezel of a liquid crystal module, it is possible to provide a liquid crystal module characterized in that: the manufacturing cost is low; the assembling work is easy; and the liquid crystal cells can be substantially uniformly illuminated from the back.

The second aspect of the invention is a basic embodiment of the present invention. Due to the invention, the branch portion of each socket is formed into a thin cylindrical shape so that it can be elastically displaced. Therefore, when each socket is slid along each lead wire, the branch portion is elastically displaced by each lead wire, and the bending angle of each lead wire in the substantially L-shaped through-hole can be extended. Accordingly, a frictional resistance generated when each socket is slid along each lead wire can be reduced. Therefore, each socket can be smoothly slid along each lead wire so that the socket can quickly, easily cover a region from the end portion of each lead wire to the end portion of straight-pipe-shaped light source. Further, there is no possibility that the brazed portion is damaged in the process of attaching work. Furthermore, there is no possibility that a heavy burden is imposed on a worker.

Only when each socket body is inserted into the lamp reflector so that the positioning portion can be contacted with the positioning point of the lamp reflector, the straight-pipe-shaped light source located between both socket bodies can be properly positioned at a predetermined position in the lamp reflector. In this case, different from the conventional case, it is unnecessary to drill the lamp reflector so as to form an engagement hole in the lamp reflector. Accordingly, the manufacturing cost can be reduced because the drilling work can be eliminated.

According to the third aspect of the invention, only when each socket body is inserted into the lamp reflector so that the lamp reflector can be pinched from both sides by the positioning protrusions, the straight-pipe-shaped light source located between both socket bodies can be properly positioned at a predetermined position in the lamp reflector.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1A:
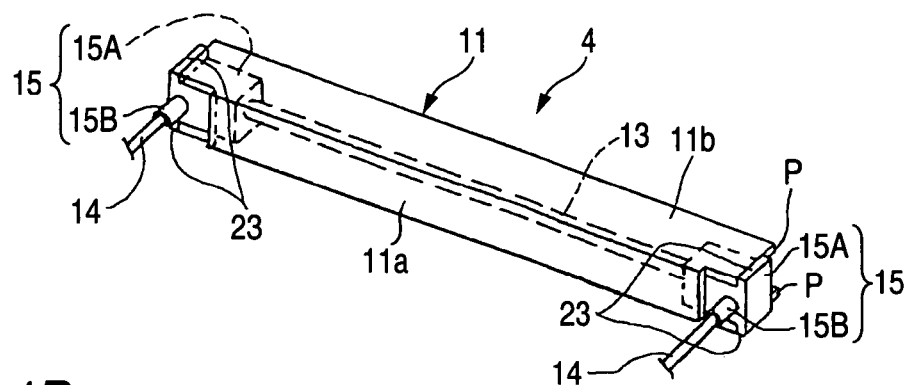
FIG. 1A is a perspective view showing a lighting device which is an embodiment of the present invention.
Figure 1B:
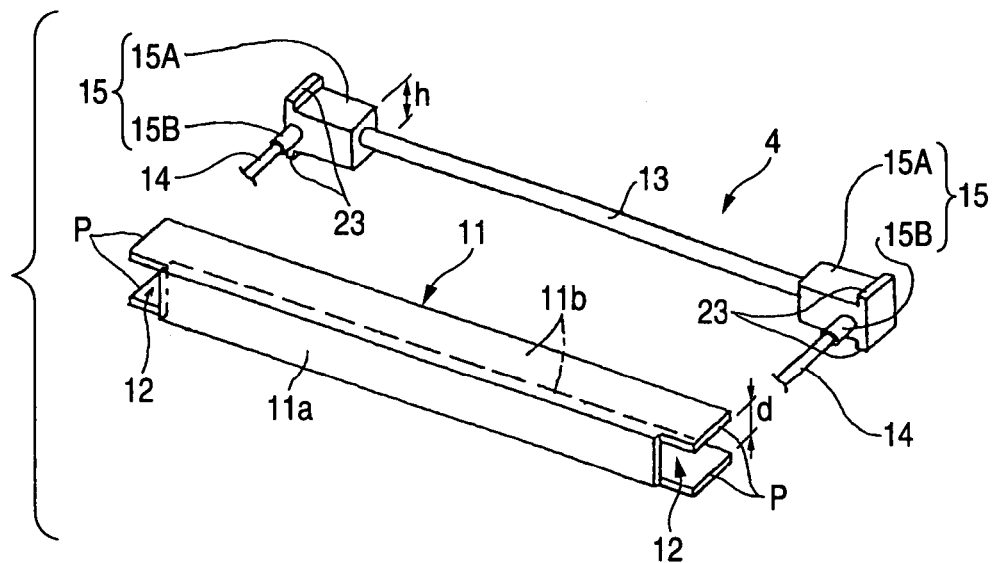
FIG. 1B is an exploded perspective view of the lighting device.
Figure 1C:
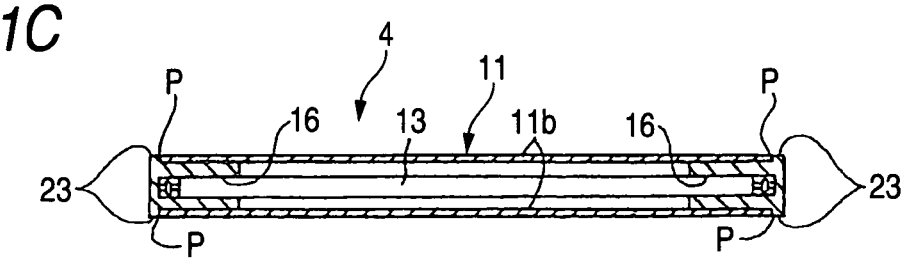
FIG. 1C is a horizontal sectional view of the lighting device.
Figure 1D:
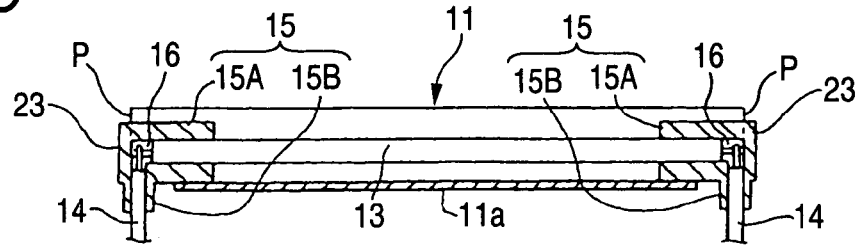
FIG. 1D is a longitudinal sectional view of the lighting device.

FIGS. 1A to 2C are views showing a lighting device 4 which is an embodiment of the present invention. This lighting device 4 is incorporated into the liquid crystal module shown in FIGS. 3 and 4. The branch portion 15B of each socket 15 is formed into a thin cylindrical shape which can be elastically displaced. End faces of both side plates 12b of the lamp reflector 11 are the points P for positioning. The positioning protrusions (the positioning portions) 23 are integrally protruded from the outer end edges on both sides of the socket body 15A. Except for the above structure, like reference characters are used to indicate like parts in FIGS. 1A to 2C and FIGS. 3 to 7C, and the same explanations are omitted here.

Figure 2A:
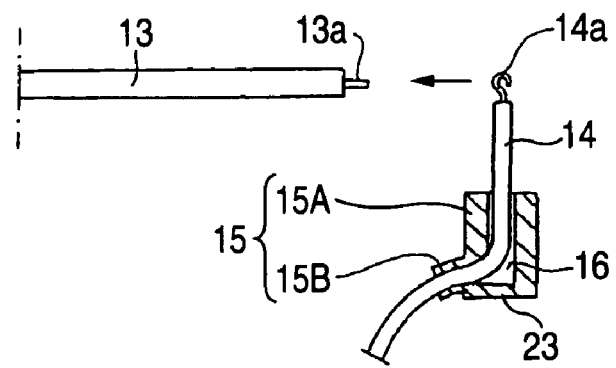
FIG. 2A is a schematic illustration showing a first part of the procedure of attaching the socket.
Figure 2B:
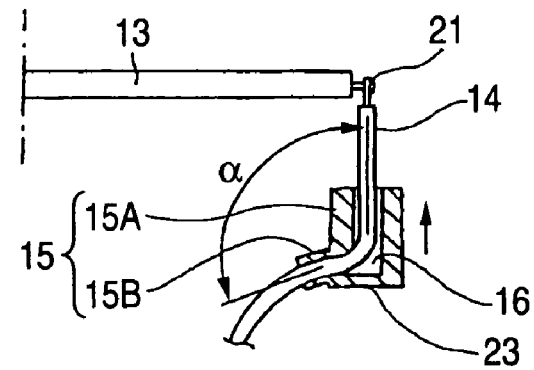
FIG. 2B is a schematic illustration showing a middle part of the procedure of attaching the socket.
Figure 2C:
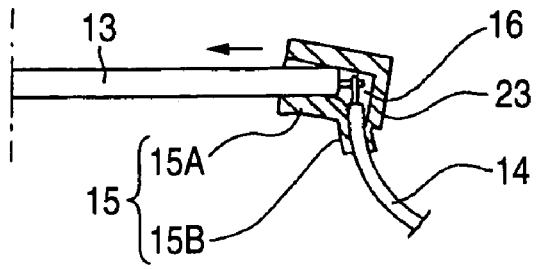
FIG. 2C is a schematic illustration showing a latter part of the procedure of attaching the socket.

The procedure of attaching the socket 15 will be explained below. As shown in FIG. 2A, under the condition that the substantially L-shaped through-passage 16 of each socket body 15A is externally engaged with each lead wire 14, as shown in FIG. 2B, the end portion 14a of each lead wire 14 is engaged with and brazed 21 to both end portions 13a of the straight-pipe-shaped light source 13. Then, as shown in FIG. 2C, each socket 15 is slid along each lead wire 14, so that each socket 15 can cover a region from the end portion 14a of each lead wire 14 to the end portion 13a of the straight-pipe-shaped light source 13. Then, each socket body 15A is inserted into the lamp reflector 11, and each positioning protrusion 23 is contacted with each positioning point P as shown in FIG. 1A.

According to the above structure, the branch portion 15B of each socket 15 is formed into a thin cylindrical shape so that it can be elastically displaced. Therefore, when each socket 15 is slid along each lead wire 14, the branch portion 15B is elastically displaced by each lead wire 14, and the bending angle α (110° in this embodiment) of each lead wire 14 in the substantially L-shaped through-hole 16 can be extended. Accordingly, a frictional resistance generated when each socket 15 is slid along each lead wire 14 can be reduced. Therefore, each socket 15 can be smoothly slid along each lead wire 14 so that the socket can quickly, easily cover a region from the end portion 14a of each lead wire 14 to the end portion 13a of the straight-pipe-shaped light source 13. Further, there is no possibility that the brazed portion 21 is damaged in the process of attaching work. Furthermore, there is no possibility that a heavy burden is imposed on a worker.

Only when each socket body 15A is inserted into the lamp reflector 11 so that the lamp reflector 11 can be pinched from both sides by the positioning protrusions 23, the straight-pipe-shaped light source 13 located between both socket bodies 15A can be properly positioned at a predetermined position in the lamp reflector 11. In this case, different from the conventional case, it is unnecessary to drill the lamp reflector 11 so as to form an engagement hole 18 in the lamp reflector 11. Accordingly, the manufacturing cost can be reduced because the drilling work can be eliminated.

Figure 3:
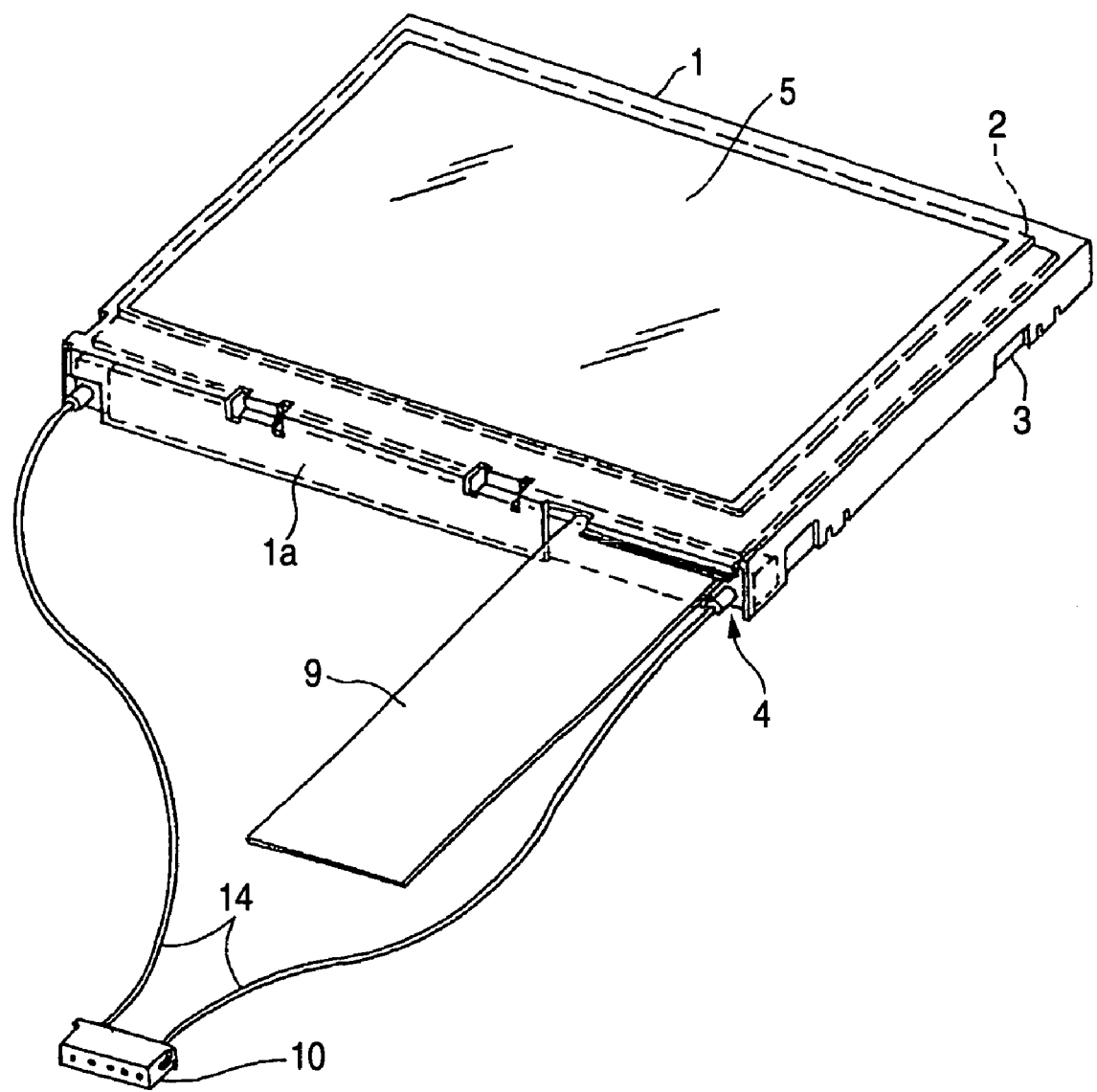
FIG. 3 is a perspective view showing a liquid crystal module.
Figure 4:
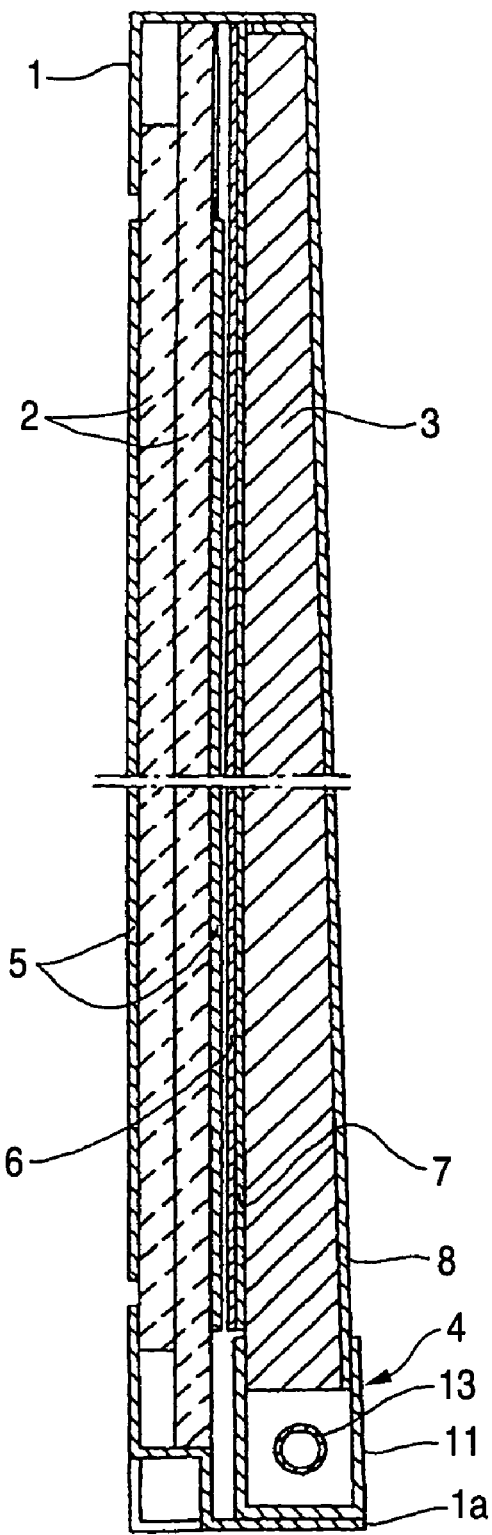
FIG. 4 is an enlarged lateral sectional view showing the liquid crystal module.
Figure 5A:
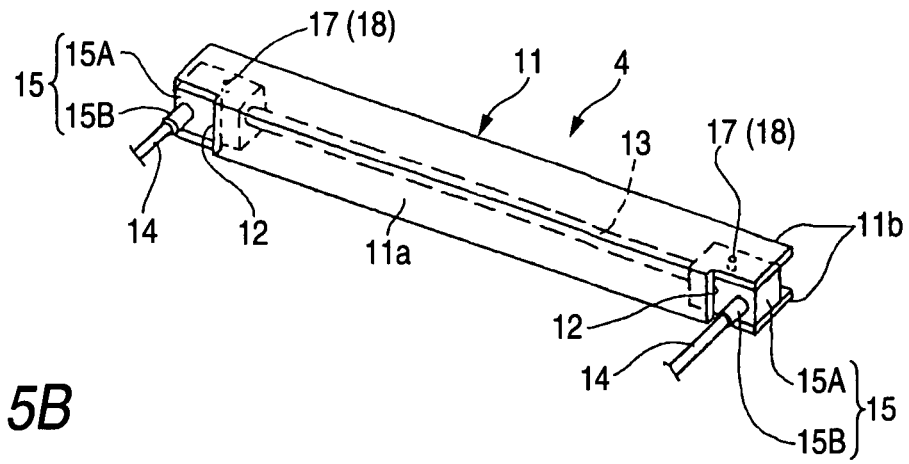
FIG. 5A is a perspective view showing a lighting device which is an example of the conventional lighting device.
Figure 5B:
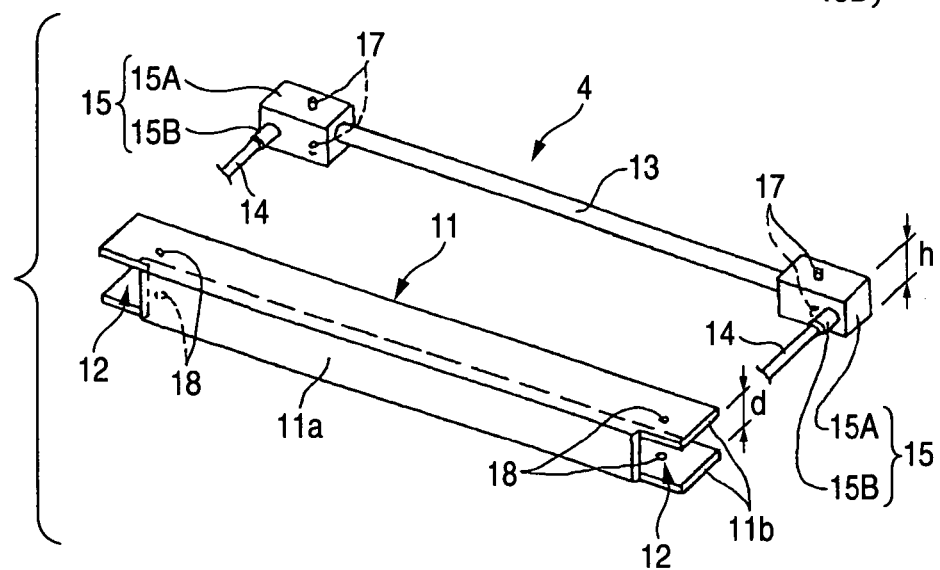
FIG. 5B is an exploded perspective view of the lighting device.
Figure 5C:
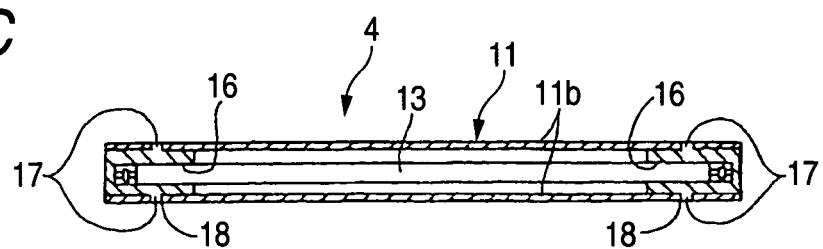
FIG. 5C is a horizontal sectional view of the lighting device.
Figure 5D:
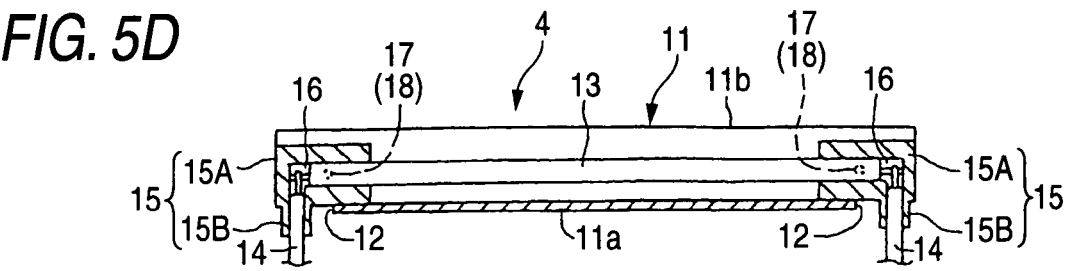
FIG. 5D is a longitudinal sectional view of the lighting device.
Figure 6A:
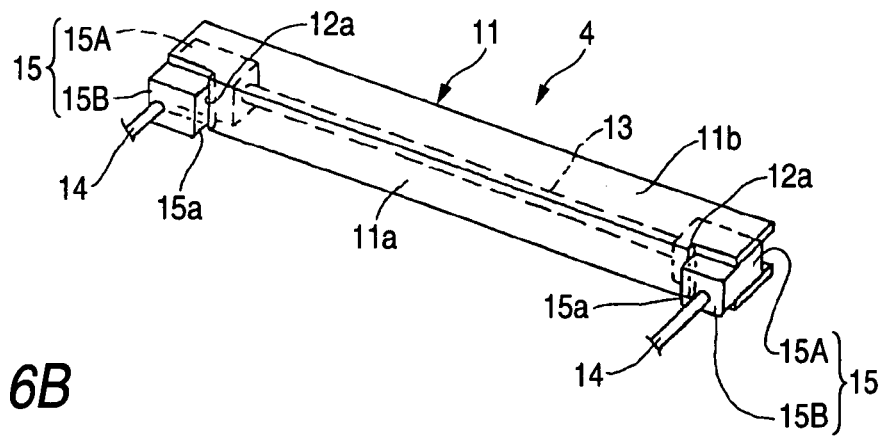
FIG. 6A is a perspective view showing a lighting device which is another example of the conventional lighting device.
Figure 6B:
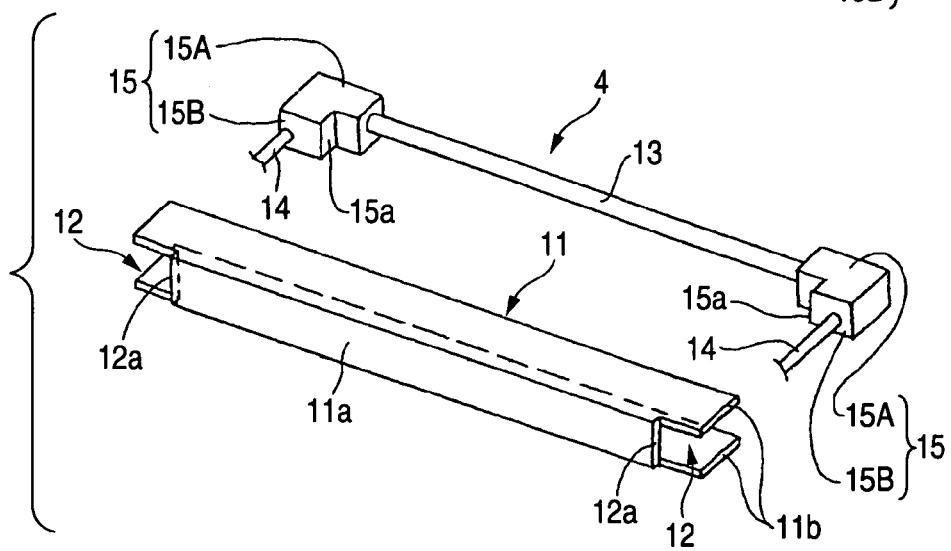
FIG. 6B is an exploded perspective view of the lighting device.
Figure 6C:
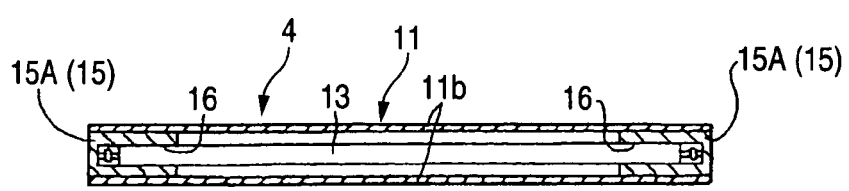
FIG. 6C is a horizontal sectional view of the lighting device.
Figure 6D:
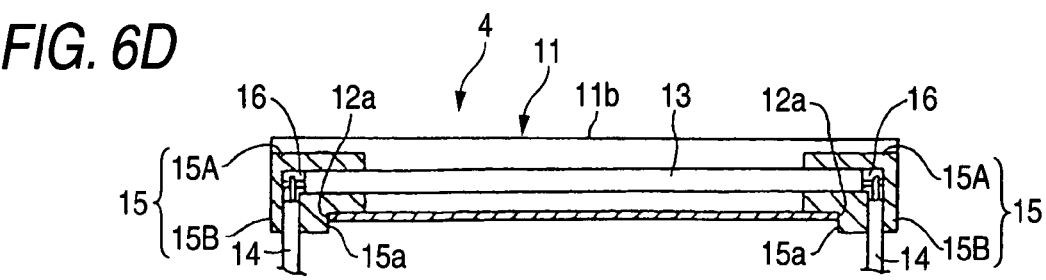
FIG. 6D is a longitudinal sectional view of the lighting device.
Figure 7A:
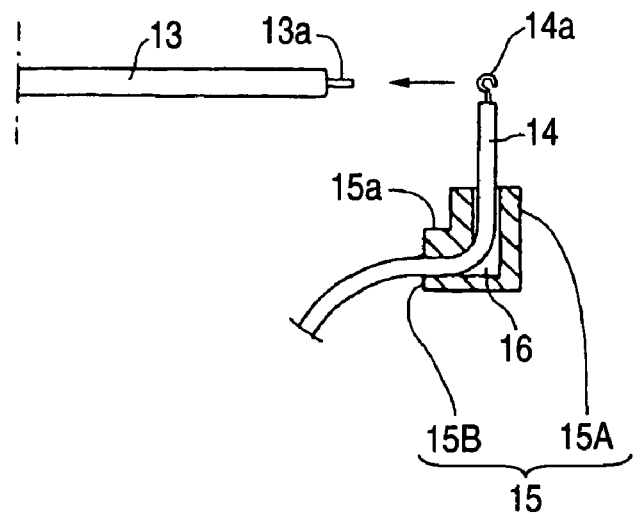
FIG. 7A is a schematic illustration showing a first part of the procedure of attaching the socket.
Figure 7B:
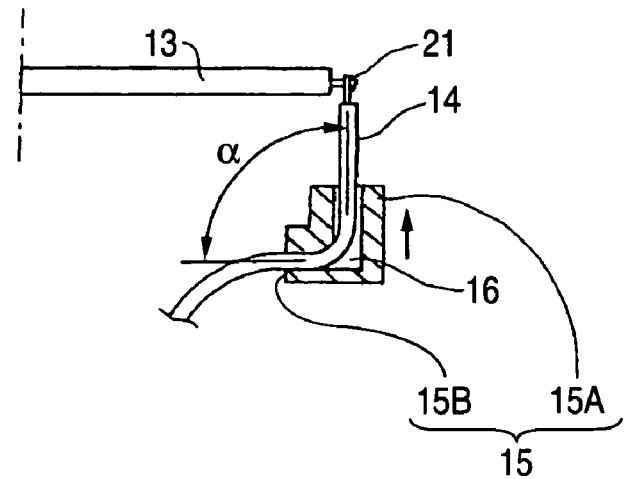
FIG. 7B is a schematic illustration showing a middle part of the procedure of attaching the socket.
Figure 7C:
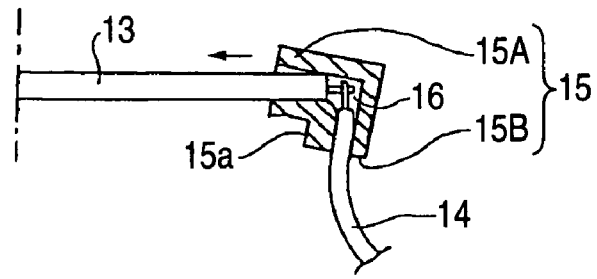
FIG. 7C is a schematic illustration showing a latter part of the procedure of attaching the socket.

Especially, when this lighting device 4 is incorporated into the bezel 1 of a liquid crystal module as shown in FIGS. 3 and 4, it is possible to provide the liquid crystal module characterized in that: the manufacturing cost is low; the assembling work is easy; and the liquid crystal cells 2 can be approximately uniformly illuminated from the back.

In the above embodiment, the lighting device 4 arranged in the liquid crystal module is taken up as an example and explained. However, it should be noted that the present invention is not limited to the above specific embodiment. The present invention can be applied for the illumination of display sections of various electronic devices except for the liquid crystal module.

What is claimed is:

1. A lighting device arranged in a bezel of a liquid crystal module for illuminating liquid crystal cells from the back via a light guide plate, comprising:
    a lamp reflector, a lateral cross section of which is a C-shape, having a bottom plate and a pair of side plates which are bent from the bottom plate at right angles, cutout portions formed at both end portions of the bottom plate;
    a straight-pipe-shaped light source arranged in the lamp reflector;
    a pair of lead wires brazed to the straight-pipe-shaped light source; and
    a pair of sockets made of elastic material, having a socket body, a width of which is substantially the same as an interval between the side plates of the lamp reflector, and also having a branch portion integrally protruding from a bottom face of the socket body, a substantially L-shaped through-passage being formed in a region from an inner end face of the socket body to an end face of the branch portion, wherein:
    each end face of both side plates of the lamp reflector is used as a positioning point; and
    a positioning protrusion integrally protrudes from each side outer end edge portion of the socket body opposed to each positioning point, respectively.

2. A lighting device comprising:
    a lamp reflector having a bottom plate and a pair of side plates which are connected to the bottom plate;
    a light source arranged in the lamp reflector;
    a pair of lead wires each of which is joined to the light source at a joint point; and
    a pair of sockets made of elastic material, each of the pair of sockets having formed therein a through-passage accommodating the joint point, and each of the pair of sockets being provided with protruded positioning portions such that the protruded positioning portions of each socket are held in contact with end portions of both the side plates of the lamp reflector.

3. The lighting device according to claim 2, wherein:
    the positioning portion includes protrusions protruding from outer end edges on both sides of each of the sockets.

* * * * *